United States Patent
Paczkowski et al.

(10) Patent No.: US 8,856,929 B1
(45) Date of Patent: Oct. 7, 2014

(54) WIRELESS COMMUNICATION DEVICE WITH CIRCUITRY TO INVOKE A PHYSICALLY INDEPENDENT NON-IP COMMUNICATION CAPABILITY

(75) Inventors: Lyle Walter Paczkowski, Mission Hills, KS (US); Stephen J. Bye, Atlanta, GA (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/418,809

(22) Filed: Mar. 13, 2012

(51) Int. Cl.
*G06F 21/00* (2013.01)
*H04W 12/08* (2009.01)
*H04L 29/06* (2006.01)

(52) U.S. Cl.
CPC ........... *H04W 12/08* (2013.01); *H04L 63/1441* (2013.01)
USPC ............................................. 726/24; 380/270

(58) Field of Classification Search
None
See application file for complete search history.

(56) References Cited

U.S. PATENT DOCUMENTS

| | | | |
|---|---|---|---|
| 7,770,785 B2 | 8/2010 | Jha et al. | |
| 2005/0232429 A1 | 10/2005 | Chowdhury et al. | |
| 2006/0026682 A1* | 2/2006 | Zakas | 726/22 |
| 2007/0083931 A1* | 4/2007 | Spiegel et al. | 726/24 |
| 2007/0088750 A1 | 4/2007 | Dumas et al. | |
| 2008/0320567 A1* | 12/2008 | Shulman et al. | 726/4 |
| 2009/0165137 A1 | 6/2009 | Yoo et al. | |
| 2011/0016529 A1* | 1/2011 | Kakie | 726/24 |

* cited by examiner

*Primary Examiner* — Gilberto Barron, Jr.
*Assistant Examiner* — Malcolm Cribbs

(57) ABSTRACT

In a wireless communication device, first micro-processing circuitry drives a user interface and drives a wireless transceiver to exchange IP communications. A detection system detects a malicious condition related to the IP communications and responsively generates a circuit transfer signal. Switching circuitry de-couples the first micro-processing circuitry from the user interface and from the wireless transceiver responsive to the circuit transfer signal. Second micro-processing circuitry then drives the user interface and drives the wireless transceiver to exchange non-IP communications.

16 Claims, 6 Drawing Sheets

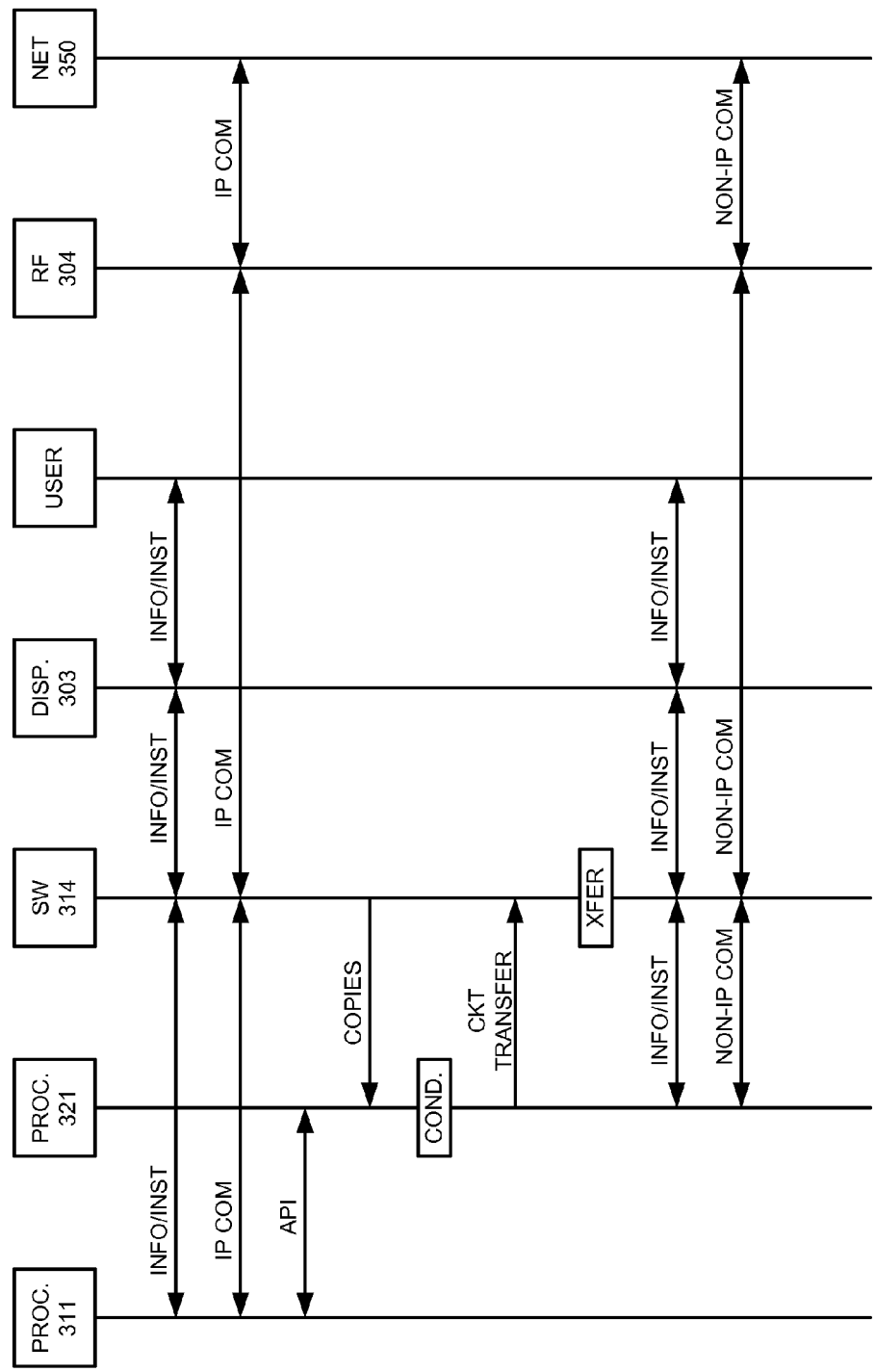

US 8,856,929 B1

WIRELESS COMMUNICATION DEVICE WITH CIRCUITRY TO INVOKE A PHYSICALLY INDEPENDENT NON-IP COMMUNICATION CAPABILITY

TECHNICAL BACKGROUND

Wireless devices communicate with wireless networks using various wireless communication protocols, such as Long Term Evolution (LTE) and Wireless Fidelity (WiFi). Examples of these wireless devices include smart-phones, media players, computers, and the like. In many cases, the wireless devices use the wireless networks to exchange Internet Protocol (IP) communications with Internet servers or other IP systems. The wireless devices and wireless networks exchange these IP communications using underlying wireless protocols, like WiFi or LTE.

Unfortunately, wireless devices and wireless networks are under constant threat of malicious attack. For example, a denial-of-service attack may be directed at the control servers in the wireless communication network. This attack may consume (waste) enough network resources to render IP communications across the network effectively useless. In other examples, software viruses may be directed at particular applications, operating systems, or user devices. The viruses may infect the wireless communication devices to render their IP communications with the network effectively useless.

TECHNICAL OVERVIEW

In a wireless communication device, first micro-processing circuitry drives a user interface and drives a wireless transceiver to exchange IP communications. A detection system detects a malicious condition related to the IP communications and responsively generates a circuit transfer signal. Switching circuitry de-couples the first micro-processing circuitry from the user interface and from the wireless transceiver responsive to the circuit transfer signal. Second micro-processing circuitry then drives the user interface and drives the wireless transceiver to exchange non-IP communications.

DESCRIPTION OF THE DRAWINGS

FIG. 6 illustrates the operation of the smart-phone to physically invoke a non-IP communication capability.

DETAILED DESCRIPTION

Figure 1:
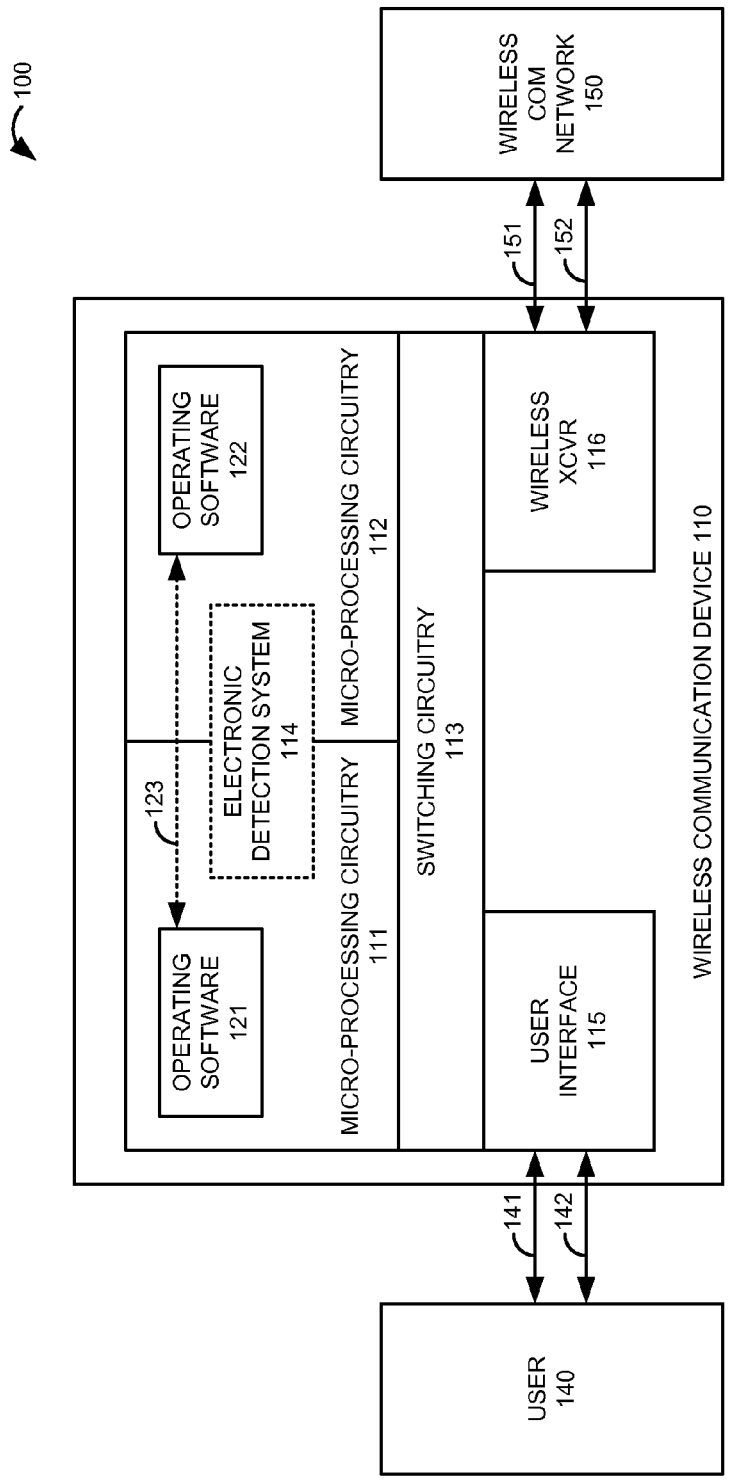
FIG. 1 illustrates a communication system to physically invoke a non-IP communication capability.

FIG. 1 illustrates communication system 100 to physically invoke a non-IP communication capability. Communication system 100 comprises wireless communication device 110, user 140, and wireless communication network 150. Wireless communication device 110 comprises circuitry 111-113, electronic detection system 114, user interface 115, and wireless transceiver 116. Note that some conventional aspects of wireless communication device 110, such as an enclosure and power supply, have been omitted from this description for clarity. Wireless communication device 110 could be a smart-phone, tablet, laptop, media player, game console, or some other user apparatus having wireless connectivity to a communication network.

Wireless communication network 150 comprises at least one wireless access node having network connectivity to other devices, servers, and the like. Wireless transceiver 116 and the wireless access node(s) in network 150 communicate over a wireless protocol, such as Long Term Evolution (LTE), Wireless Fidelity (WiFi), or some other wireless format. Wireless communication network 150 could be a small WiFi network, a large LTE network, or some other type of network that provides wireless access to networks, devices, servers, and the like.

In wireless communication device 110, micro-processing circuitry 111 processes operating software 121 to drive user interface 115 to present information 141 to user 140. Micro-processing circuitry 111 also processes operating software 121 to drive wireless transceiver 116 to exchange wireless signals transporting Internet Protocol (IP) communications 151 with wireless communication network 150. Note that IP communications 151 are transported by an underlying wireless protocol, such as LTE or WiFi. These user and network interactions might support emailing, on-line gaming, voice communications, data transfers, or some other communication-based service.

Electronic detection system 114 detects a malicious condition related to IP communications 141. The malicious condition could be a large-scale denial-of-service attack on various IP-based networks and systems. The malicious condition could be viral software operating on device 110 (and possibly other like devices) to inhibit communication service at the IP layer. The malicious condition could be some other condition that restricts IP communications.

The detection of the malicious condition could take various forms. The detection could be based on the receipt and processing of an IP alarm from wireless communication network 150. The detection could be based on the processing of various data (such as IP failures, errors, and malicious activities) that is either available within device 110 or that is obtained over wireless communication network 150. For example, the detection could be the determination that the amount of IP communication failures during a given time period exceeds a threshold—and this determination and/or this threshold could be initiated and controlled by instructions from wireless communication network 150. Electronic detection system 114 comprises software and circuitry that is typically distributed across circuitry 111-113 and software 121-122, although electronic detection system 114 may be primarily hosted by circuitry 112 and software 122.

In response to detecting the malicious condition, electronic detection system 114 generates and transfers a circuit transfer signal to switching circuitry 113. In response to the circuit transfer signal, switching circuitry 113 de-couples micro-processing circuitry 111 from user interface 115 and from wireless transceiver 116. In some examples the de-coupling is physical. In other examples, the de-coupling is logical, although any logical decoupling should be resistant to any viral control of micro-processing circuitry 111.

In response to the malicious condition (or the circuit transfer signal), micro-processing circuitry 112 processes operating software 122 to drive user interface 115 to present information 142 to user 140. Micro-processing circuitry 112 also processes operating software 122 to drive wireless transceiver 116 to exchange wireless signals transporting non-IP communications 152 with wireless communication network 150. Note that non-IP communications 152 are transported by an underlying wireless protocol, such as LTE or WiFi.

Note that wireless communication network 150 performs reciprocal communication signal processing to handle the non-IP communications—possibly by using physically separate circuitry and software as described herein for wireless communication device 110. These user and network interactions might also support emailing, on-line gaming, voice communications, data transfers, or some other communication-based service.

In some examples, micro-processing circuitry 112 processes operating software 122 to drive wireless transceiver 116 to exchange wireless signals that indicate the use of non-IP communications 152 to wireless communication network 150. For example, transceiver 116 might insert a flag or code in an LTE or WiFi overhead location to indicate the transfer of the non-IP communications Likewise, wireless communication network 150 may direct the use of the non-IP communications by inserting a corresponding code or instruction in an overhead location of the wireless protocol. For example, transceiver 116 might receive a special "use non-IP communications" code in the overhead portion of the LTE or WiFi signals. The reception of this special code from network 150 might represent the detection of a malicious condition as described herein.

Operating software 122 includes a non-IP communications module that operates at layer three of the Open Systems Interconnect (OSI) model. The non-IP communications module may utilize protocols such as Message Transfer Part (MTP), Asynchronous Transfer Mode (ATM), Frame Relay (FR), X.25, or some other OSI layer 3 communication software.

Micro-processing circuitry 112 may be pre-coupled to user interface 115 and wireless transceiver 116, or switching circuitry 113 could couple micro-processing circuitry 112 to user interface 115 and wireless transceiver 116 in response to the circuit transfer signal. In some examples the coupling is physical. In other examples, the coupling is logical, although any logical coupling should be resistant to viral control of circuitry 111.

Micro-processing circuitry 111 is physically separated from micro-processing circuitry 112. In some examples, micro-processing circuitry 111 is on the motherboard, but micro-processing circuitry 112 is not on the motherboard. In some examples, micro-processing circuitry 111 and micro-processing circuitry 112 comprise separate and mutually exclusive micro-processor chipsets, chips, and/or processing cores.

In wireless communication device 110, micro-processing circuitry 111 processes operating software 121 to provide Application Programming Interface (API) 123 to operating software 122 in micro-processing circuitry 112. Likewise, micro-processing circuitry 112 processes operating software 122 to communicate over API 123 with operating software 121. Typically, operating software 121 provides API 123 to various other applications executing on wireless communication device 110.

In some examples, electronic detection system 114 is hosted by micro-processing circuitry 112 and operating software 122. In these examples, electronic detection system 114 may communicate over API 123 to detect the malicious condition or initiate the circuit transfer signal. For example, electronic detection system 114 may first communicate over API 123 to drive user interface 115 to notify user 140 and obtain user consent before generating the circuit transfer signal to invoke the non-IP communication capability.

Figure 2:
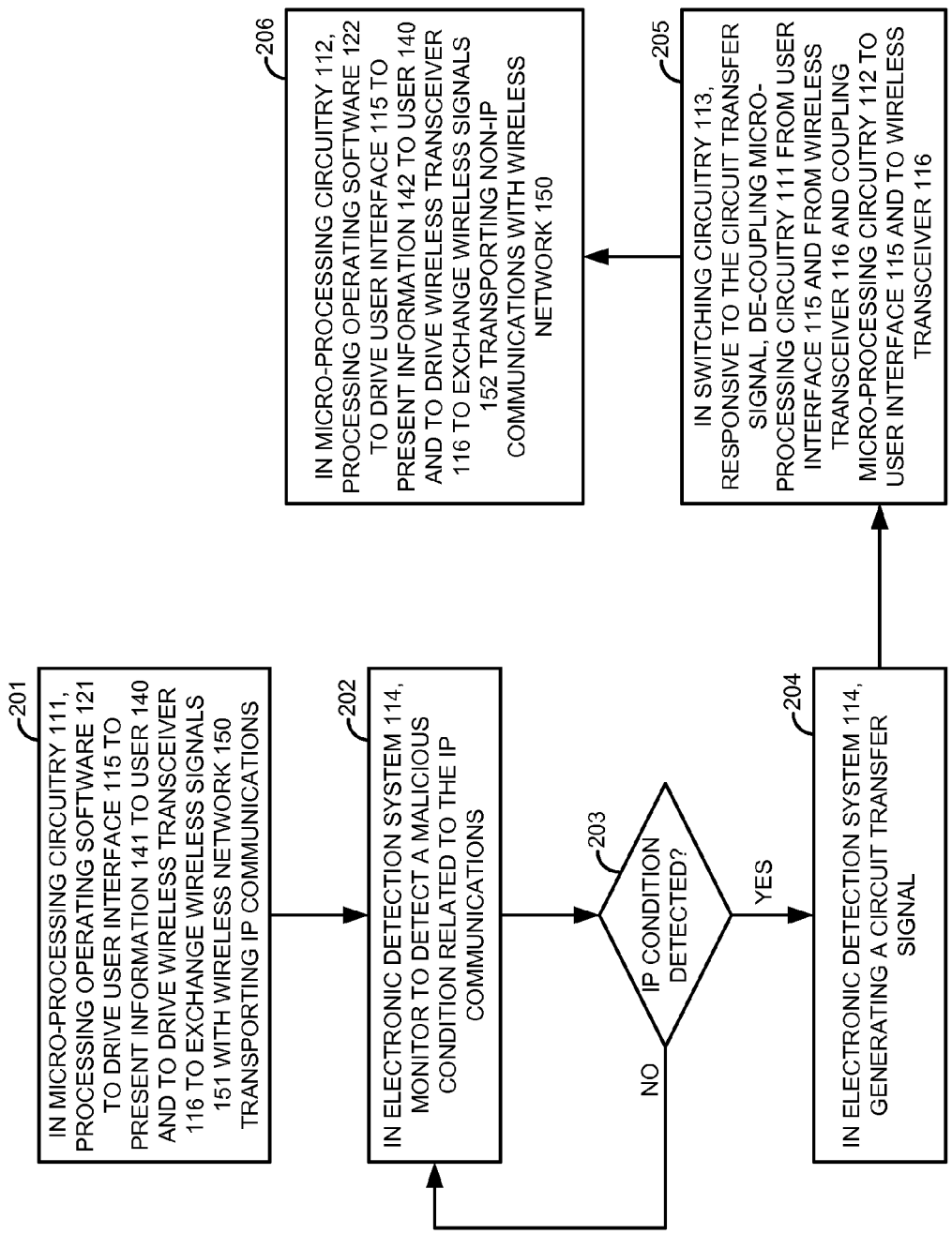
FIG. 2 illustrates the operation of a communication system to physically invoke a non-IP communication capability.

FIG. 2 illustrates the operation of communication system 100 to physically invoke a non-IP communication capability. Micro-processing circuitry 111 processes operating software 121 to drive user interface 115 to present information 141 to user 140 (201). Micro-processing circuitry 111 also processes operating software 121 to drive wireless transceiver 116 to exchange wireless signals transporting IP communications 151 with wireless communication network 150 (201). IP communications 151 supports file transfers, conferencing, messaging, gaming, and the like. IP communications 151 are transported to wireless network 150 using LTE, WiFi, Code Division Multiple Access (CDMA), Global System for Mobile communications (GSM), Universal Mobile Telecommunications System (UMTS), High-Speed Packet Access (HSPA), Evolution-Data Optimized (EV-DO), Worldwide Interoperability for Microwave Access (WiMAX), or some other wireless communication protocol—including combinations thereof.

Electronic detection system 114 monitors to detect a malicious condition related to IP communications 141 (202). The malicious condition could be a network attack, viral software, or some other condition that restricts IP communications. The detection of the malicious condition could be based on data in wireless device 110 and/or network 150. In some examples, the detection is based on whether an amount of IP failures during a time period exceeds a threshold. In other examples, the detection is based on the ability of detection system 114 to effectively interact with micro-processing circuitry 111 and operating software 121—possibly using API 123. In other examples, the detection is based on an instruction from wireless communication network 150.

In response to detecting the malicious condition (203), electronic detection system 114 generates and transfers a circuit transfer signal to switching circuitry 113 (204). In response to the circuit transfer signal, switching circuitry 113 physically de-couples micro-processing circuitry 111 from user interface 115 and from wireless transceiver 116 (205). Also in response to the circuit transfer signal, switching circuitry 113 physically couples micro-processing circuitry 112 to user interface 115 and to wireless transceiver 116 (205).

In response to the malicious condition and/or the circuit transfer signal, micro-processing circuitry 112 processes operating software 122 to drive user interface 115 to present information 142 to user 140 (206). Micro-processing circuitry 112 also processes operating software 122 to drive wireless transceiver 116 to exchange wireless signals transporting non-IP communications 152 with wireless communication network 150 (206). Non-IP communications 152 supports file transfers, conferencing, messaging, gaming, and the like. Non-IP communications 152 are transported to wireless network 150 using LTE, WiFi, CDMA, GSM, UMTS, HHSPA, EV-DO, WiMAX, or some other wireless communication protocol—including combinations thereof.

In some examples, micro-processing circuitry 112 processes operating software 122 to drive wireless transceiver 116 to exchange wireless signals that indicate the use of non-IP communications 152 to wireless communication network 150. Wireless transceiver 116 typically indicates the use of non-IP communications in an overhead location of the wireless protocol. For example, wireless transceiver 116 might insert a special "using non-IP communications" code in the overhead portion of the LTE, WiFi, CDMA, GSM, UMTS, HHSPA, EV-DO, or WiMAX signals. In response to this indication, wireless communication network 150 performs reciprocal communication signal processing to handle the non-IP communications—possibly by using physically separate circuitry and software as described herein for device 110.

Likewise, wireless communication network 150 may direct the use of non-IP communications by using an overhead location of the wireless protocol. For example, wireless transceiver 116 might receive a special "use non-IP communications" code in the overhead portion of the LTE, WiFi, CDMA, GSM, UMTS, HHSPA, EV-DO, or WiMAX signals. This reception of the special code from wireless communication network 150 might represent the detection of a malicious condition as described herein.

Figure 3:
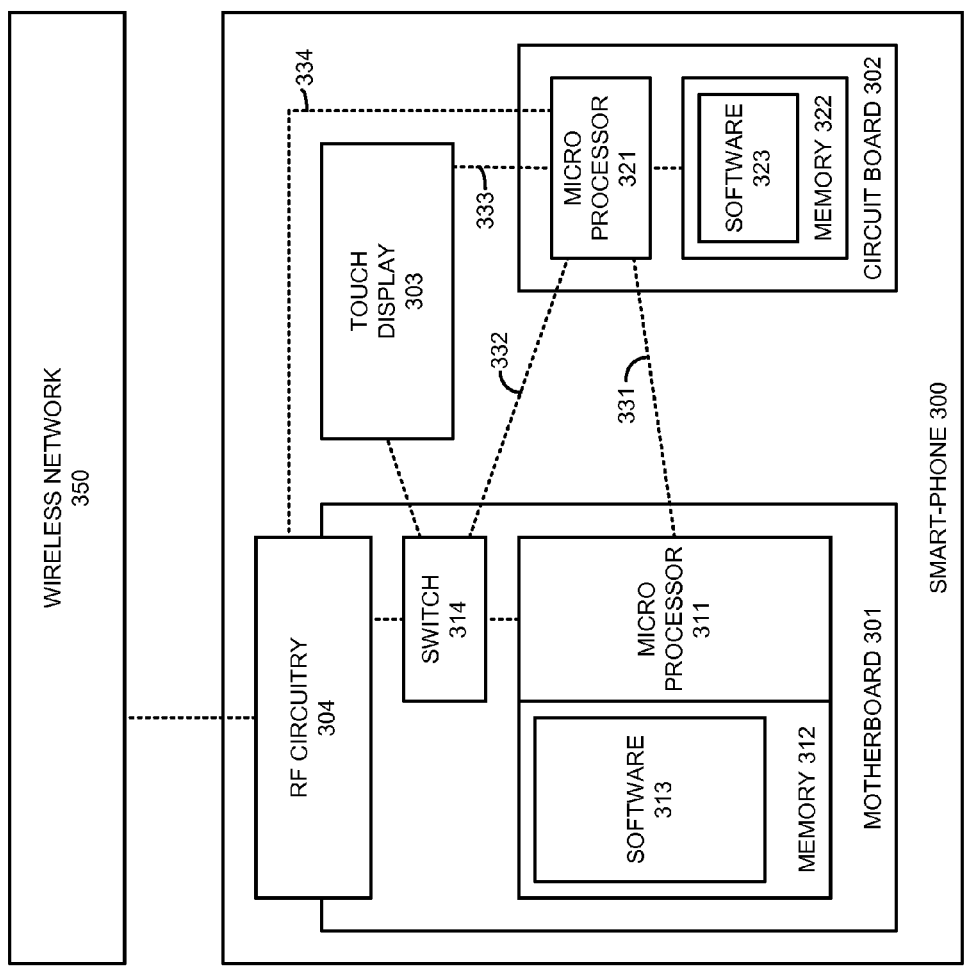
FIG. 3 illustrates a smart-phone to physically invoke a non-IP communication capability.

FIG. 3 illustrates smart-phone 300 to physically invoke a non-IP communication capability. Note that this description of a smart-phone is exemplary, and other wireless communication devices could be configured and operate in a similar manner. Smart-phone 300 comprises motherboard 301, circuit board 302, touch display 303, and Radio Frequency (RF) circuitry 304. On motherboard 301, smart-phone 300 includes micro-processor 311, memory 312, software 313, switch 314 and a portion of RF circuitry 304. On circuit board 302, smart-phone 300 includes micro-processor 321, memory 322, and software 323. Some conventional aspects of smart-phone 300 are omitted from FIG. 3 for clarity.

Micro-processor 311 retrieves software 313 from memory 312 and executes software 313 to operate smart-phone 300 Likewise, micro-processor 321 retrieves software 323 from memory 322 and executes software 323 to detect malicious conditions and transfer the operational control of smart-phone 300 from motherboard 301 to circuit-board 302. Software 323 includes an operating system, drivers, applications, utilities, and the like.

Micro-processor 311 provides API 331 to micro-processor 321. Micro-processor 321 uses API 331 to detect malicious conditions that trigger the transfer of operational control. Malicious conditions include the loss of effective IP communications or the loss of API effectiveness. In some examples, micro-processor 321 also uses API 331 to obtain user consent to transfer of operational control. For example, micro-processor 321 may use API 331 to direct micro-processor 311 to drive touch display 303 to display a control transfer prompt and receive a consent touch input.

Micro-processor 321 transfers operational control by providing circuit transfer signal 332 to switch 314. In response to circuit transfer signal 332, switch 314 physically de-couples micro-processor 311 from touch display 303, RF circuitry 304, and possibly other components. Micro-processor 321 also transfers operational control by exchanging display signals 333 with touch display 303 and by exchanging communication signals 334 with RF circuitry 304 in accord with software 323 in its post-transfer state.

Micro-processor 321 drives RF circuitry 304 to insert a code in the overhead of the wireless protocol to inform wireless network 350 that smart-phone 300 is proceeding with non- IP communications. Micro-processor 321 may drive touch display 303 to obtain user consent for the transfer of control. Micro-processor 321 may drive touch display 303 to offer some applications and services to the user. Micro-processor 321 may then drive RF circuitry 304 to wirelessly exchange non-IP communications with wireless network 350 to support any selected applications or services.

Although switch 314 is shown on mother board 301 on FIG. 3, switch 314 could be located on circuit board 302 or elsewhere in smart-phone 300 and perform the operations described herein.

Figure 4:
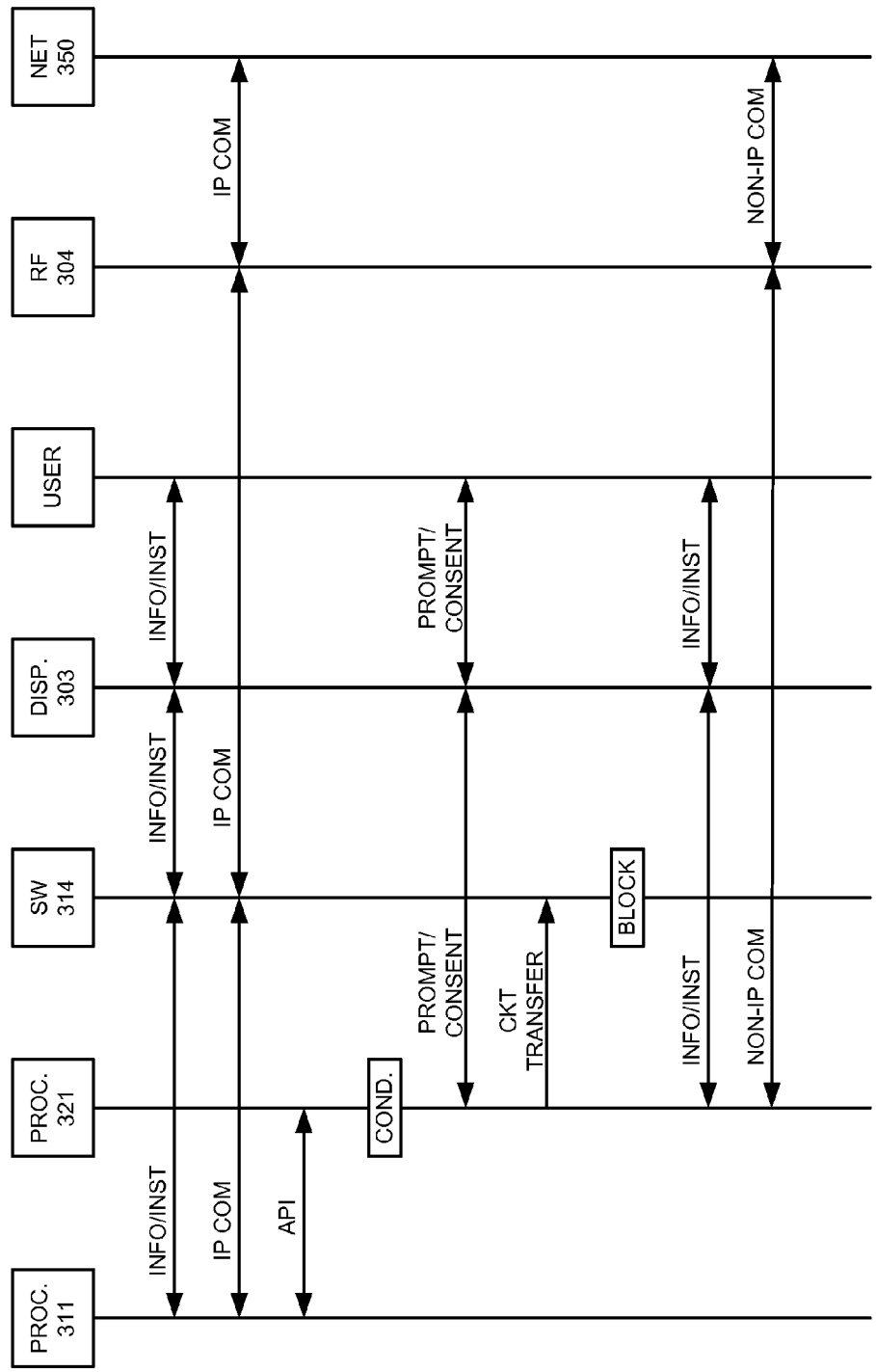
FIG. 4 illustrates the operation of the smart-phone to physically invoke a non-IP communication capability.

FIG. 4 illustrates the operation of smart-phone 300 to physically invoke a non-IP communication capability. Micro-processor 311 and the user exchange information and instructions through switch 314 and touch display 303. Micro-processor 311 and wireless network 350 exchange IP communications through switch 314 and RF circuitry 304. Micro-processors 311 and 321 communicate over API 331, and as a result, micro-processor 321 detects a malicious condition.

In response to detecting the malicious condition, micro-processor 321 prompts the user to transfer operational control through display signals 333 to display 303. In response to the prompt, the user provides consent through display 303 and display signals 333. In response to the user consent, micro-processor 321 transfers circuit transfer signal 332 to switch 314. In response to circuit transfer signal 332, switch 314 blocks micro-processor 311 from driving display 303 or driving RF circuitry 304. In response to detecting the malicious condition, micro-processor 321 and the user exchange information and instructions through touch display 303. Micro-processor 321 and wireless network 350 also exchange non-IP communications through RF circuitry 304.

Figure 5:
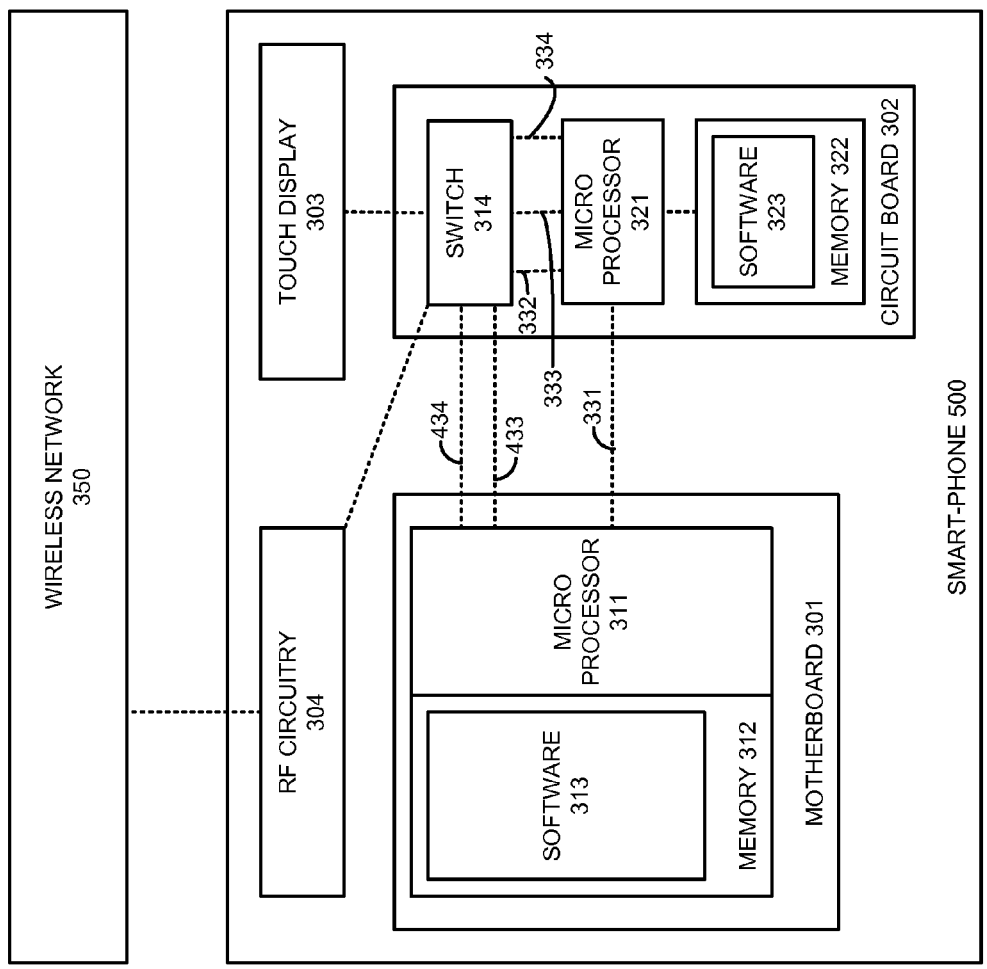
FIG. 5 illustrates a smart-phone to physically invoke a non-IP communication capability.

FIG. 5 illustrates smart-phone 500 to physically invoke a non-IP communication capability. Note that this description of a smart-phone is exemplary, and other wireless communication devices could be configured and operate in a similar manner. Smart-phone 500 comprises motherboard 301, circuit board 302, touch display 303, and RF circuitry 304. On motherboard 301, smart-phone 300 includes micro-processor 311, memory 312 and software 313. On circuit board 302, smart-phone 300 includes switch 314, micro-processor 321, memory 322, and software 323. Some conventional aspects of smart-phone 500 are omitted from FIG. 5 for clarity.

Micro-processor 311 retrieves software 313 from memory 312 and executes software 313 to operate smart-phone 500. To operate smart-phone 500, micro-processor 311 exchanges display signals 433 with touch display 303 through switch 314. Micro-processor 311 also exchanges communication signals 434 with RF circuitry 304 through switch 314.

Micro-processor 321 retrieves software 323 from memory 322 and executes software 323 to detect malicious conditions and transfer the operational control of smart-phone 500 from motherboard 301 to circuit-board 302. Micro-processor 321 may use API 331 to detect the malicious conditions. In addition, switch 314 may provide micro-processor 321 with copies of display signals 433 and communications signals 434, and micro-processor 321 can process the copies of signals 433-434 to detect the malicious conditions.

Micro-processor 321 transfers operational control by providing circuit transfer signal 332 to switch 314. In response to circuit transfer signal 332, switch 314 physically de-couples display signals 433 from touch display 303 and physically de-couples communication signals 434 from RF circuitry 304. In response to circuit transfer signal 332, switch 314 physically couples display signals 333 with touch display 303 and physically couples communication signals 334 with RF circuitry 304. Micro-processor 321 implements operational control by exchanging display signals 333 with touch display 303 and by exchanging communication signals 334 with RF circuitry 304 in accord with software 323 in its post-transfer state.

Micro-processor 321 drives RF circuitry 304 to insert a code in the overhead of the wireless protocol to inform wireless network 350 that smart-phone 500 is proceeding with non-IP communications. Micro-processor 321 may drive touch display 303 to obtain user consent for the control transfer. Micro-processor 321 may drive touch display 303 to offer some applications and services to the user. Micro-processor 321 may then drive RF circuitry 304 to wirelessly exchange non-IP communications with wireless network 350 to support any selected applications or services.

Although switch 314 is shown on circuit board 302 on FIG. 5, switch 314 could be located on motherboard 301 or elsewhere in smart-phone 500 and perform the operations described herein.

FIG. 6 illustrates the operation of smart-phone 500 to physically invoke a non-IP communication capability. Micro-processor 311 and the user exchange information and instructions through switch 314 and touch display 303. Micro-processor 311 and wireless network 350 exchange IP communications through switch 314 and RF circuitry 304. Micro-processors 311 and 321 communicate over API 331. Switch 314 also transfers copies of signals 433-434 to micro-processor 321. Micro-processor 321 processes API 314, display signals 433, and communication signals 434 to detect malicious conditions.

In response to detecting a malicious condition, micro-processor 321 transfers circuit transfer signal 332 to switch 314. In response to circuit transfer signal 332, switch 314 transfers operational control by de-coupling display signals 433 (and micro-processor 311) from touch display 303 and by coupling display signals 333 (and micro-processor 321) with touch display 303. In response to circuit transfer signal 332, switch 314 transfers operational control by de-coupling communication signals 434 (and micro-processor 311) from RF circuitry 304 and by coupling communication signals 334 (and micro-processor 321) with RF circuitry 304. In response to detecting the malicious condition, micro-processor 321 and the user exchange information and instructions through switch 314 touch display 303. Micro-processor 321 and wireless network 350 also exchange non-IP communications through switch 314 and RF circuitry 304.

In the above examples, operational control is transferred from an IP-based system to a non-IP-based system responsive to malicious conditions. In a reciprocal manner, operational control could be returned to the IP-based system responsive to the return of normal conditions. In the above examples, the memories each comprise one or more non-transitory storage media, such as a disk drive, flash drive, data storage circuitry, or some other memory apparatus. The software comprises computer programs, firmware, or some other form of machine-readable processing instructions. When executed by the micro-processing circuitry, the software directs the micro-processing circuitry to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
    in first micro-processing circuitry, processing first software to drive a user interface to present first information to a user and to drive a wireless transceiver to exchange first wireless signals transporting Internet Protocol (IP) communications with a wireless communication network;
    in the first micro-processing circuitry, processing the first software to provide an Application Programming Interface (API) to a second software in a second micro-processing circuitry;
    in the second micro-processing circuitry, processing the second software to communicate over the API with the first software in the first micro-processing circuitry, detecting a malicious condition related to the IP communications, and in response, generating a circuit transfer signal;
    in switching circuitry, responsive to the circuit transfer signal, de-coupling the first micro-processing circuitry from the user interface and from the wireless transceiver; and
    in the second micro-processing circuitry, processing the second software to drive the user interface to present second information to the user and to drive the wireless transceiver to exchange second wireless signals transporting non-IP communications with the wireless communication network.

2. The method of claim 1 wherein:
    the wireless transceiver uses a wireless communication protocol; and
    processing the second software to drive the wireless transceiver to exchange the second wireless signals comprises driving the wireless transceiver to indicate the non-IP communications to the wireless communication network in an overhead portion of the wireless communication protocol.

3. The method of claim 1 further comprising, in the switching circuitry, coupling the second micro-processing circuitry to the user interface and to the wireless transceiver responsive to the circuit transfer signal.

4. The method of claim 1 wherein:
    detecting the malicious condition and responsively generating the circuit transfer signal comprises communicating over the API to drive the user interface to notify the user and obtain user consent and generating the circuit transfer signal responsive to the user consent.

5. The method of claim 1 wherein the second software comprises a non-IP module that operates at layer three of the Open Systems Interconnect (OSI) model to drive the wireless transceiver to exchange the second wireless signals transporting the non-IP communications with the wireless communication network.

6. The method of claim 1 wherein detecting the malicious condition comprises detecting that an amount of failures with the IP communications during a time period exceeds a threshold.

7. The method of claim 1 wherein the first micro-processing circuitry is on a motherboard and wherein the second micro-processing system is not on the motherboard.

8. The method of claim 1 wherein:
    the first micro-processing circuitry comprises at least one of a first chipset, first chip, and first processing core;
    the second micro-processing circuitry comprises at least one of a second chipset, second chip, and second processing core; and
    the first micro-processing circuitry and the second micro-processing circuitry are mutually exclusive.

9. A wireless communication device comprising:
    first micro-processing circuitry configured to process first software to drive a user interface to present first information to a user and to drive a wireless transceiver to exchange first wireless signals transporting Internet Protocol (IP) communications with a wireless communication network, and to provide an Application Programming Interface (API) to a second software in a second micro-processing circuitry;
    the second micro-processing circuitry configured to process the second software to communicate over the API with the first software in the first micro-processing circuitry wherein the second micro-processing circuitry processing the second software comprises an electronic detection system;

the electronic detection system configured to detect a malicious condition related to the IP communications, and in response, generate a circuit transfer signal;

switching circuitry configured to de-couple the first micro-processing circuitry from the user interface and from the wireless transceiver responsive to the circuit transfer signal; and the second micro-processing circuitry configured to process the second software to drive the user interface to present second information to the user and to drive the wireless transceiver to exchange second wireless signals transporting non-IP communications with the wireless communication network.

10. The wireless communication device of claim 9 wherein:
the wireless transceiver uses a wireless communication protocol; and
the second micro-processing circuitry is configured to drive the wireless transceiver to indicate the non-IP communications to the wireless communication network in an overhead portion of the wireless communication protocol.

11. The wireless communication device of claim 9 wherein the switching circuitry is configured to couple the second micro-processing circuitry to the user interface and to the wireless transceiver responsive to the circuit transfer signal.

12. The wireless communication device of claim 9 wherein:
the electronic detection system is configured to communicate over the API to drive the user interface to notify the user and obtain user consent and to generate the circuit transfer signal responsive to the user consent.

13. The wireless communication device of claim 9 wherein the second software comprises a non-IP module that operates at layer three of the Open Systems Interconnect (OSI) model to drive the wireless transceiver to exchange the second wireless signals transporting the non-IP communications with the wireless communication network.

14. The wireless communication device of claim 9 wherein the electronic detection system is configured to detect the malicious condition by detecting that an amount of failures with the IP communications during a time period exceeds a threshold.

15. The wireless communication device of claim 9 wherein the first micro-processing circuitry is on a motherboard and wherein the second micro-processing system is not on the motherboard.

16. The wireless communication device of claim 9 wherein:
the first micro-processing circuitry comprises at least one of a first chipset, first chip, and first processing core;
the second micro-processing circuitry comprises at least one of a second chipset, second chip, and second processing core; and
the first micro-processing circuitry and the second micro-processing circuitry are mutually exclusive.

* * * * *